Oct. 7, 1958  W. GRÜBER  2,855,014
REPAIR PATCH FOR RUBBER AND RUBBERIZED ARTICLES
Filed March 31, 1955  2 Sheets-Sheet 1

INVENTOR
WILHELM GRUBER

Oct. 7, 1958  W. GRÜBER  2,855,014
REPAIR PATCH FOR RUBBER AND RUBBERIZED ARTICLES
Filed March 31, 1955  2 Sheets-Sheet 2

INVENTOR
WILHELM GRUBER

BY
ATTORNEYS

United States Patent Office 2,855,014
Patented Oct. 7, 1958

2,855,014

REPAIR PATCH FOR RUBBER AND RUBBERIZED ARTICLES

Wilhelm Grüber, Furstenzell, near Passau, Germany, assignor to Stahlgruber, Otto Gruber & Co., Munich, Germany Application March 31, 1955, Serial No. 498,360

Claims priority, application Germany April 24, 1954

17 Claims. (Cl. 152—367)

The present invention relates to a repair patch for rubber and rubberized articles such as motor vehicle and bicycle inner tubes and tires, rubber shoes, conveyor belts and the like.

Repair patches for such purposes are known which comprise a slightly convex main body of vulcanized rubber and which terminates in a relatively thin perimetrical zone and which is provided on its under side, that is the side which is to face the article to be repaired, with a thin adhesive connecting or attaching layer, the latter expediently projecting beyond the perimetrical edge of the main body and thus forming a thin projecting rim on the patch. After cleaning the damaged area, for example, a hole in an inner tube, and after wetting the latter with a vulcanizing liquid, such normal repair patch must be applied and pressed on without formation of any creases or folds, whereupon the patch is in a known manner vulcanized by means of the connecting layer to the vulcanized rubber of the inner tube under the action of the heat and pressure conditions arising during use of the inner tube.

A pre-requisite for a satisfactory repair and the avoidance of a subsequent partial or complete detachment of the patch requires that the manipulations necessary to apply the patch be effected carefully and skillfully. Moreover in all repairs which have to be effected on resilient, hollow containers having media therein under internal pressure, such as an inner tube, it is important that the patches be so positioned on the damaged area, for example, a hole or puncture, that the thickest and strongest part of the main body of the patch be disposed over the actual damaged area. This is necessary so that the edges of the patch which are made thin for specific reasons, be not unduly or excessively stressed so as to lead to overstretching and in certain instances damage or detachment particularly under conditions involving considerable pressure such as for example, the pressure of 6.5 atmospheres existing inside the inner tube of a heavy truck tire. Experience has demonstrated that even when all prescribed conditions are followed over-stressing of the patch frequently occurs, particularly when the patches are used to repair motor vehicle inner tubes. This is especially noticeable when the patch is applied at portions of the tube which when subsequently inserted in the tire casing are not subjected to counteracting pressures or are only subjected to slight pressure due to contact. Such portions or places are formed when the inner tube does not bear completely on the inside of the tire casing and the patches are disposed, for example, in the region of the rim.

It would be possible to remedy this disadvantage by constructing a patch having a main body, particularly the central portion thereof, of increased thickness but this course of procedure is not suitable in practice. For example, in the case of bodies which are to withstand a high internal pressure, if the thickness of that portion of the patch which is positioned above the damaged area is to be adapted in its dimensions to the operating pressure, this thickness in certain instances would have to be so large as to make it impossible to ensure that an inflated tube would bear smoothly against the tire casing at the area of the patch. As an example, if the inner tube had an internal pressure of 6.5 atmospheres, the body layer of a patch to repair the same would have to have a thickness of about 6 mm. Moreover as a result of increased thickness, the likelihood of displacement of the inner tube within the casing is increased and thus the danger of wear or abrasive action on the upper side of the patch is enhanced. Experience has demonstrated that this may lead to complete rubbing away of the patch and it will be readily understood that this disadvantage is further magnified if a fresh patch has to be applied at the same area. On the other hand, in the event of another puncture or air leak at the area where one patch has already been applied, it is unavoidable that the second patch has to be applied above the first since no possibility exists for removing or separating the first patch which has already been vulcanized to the tube unless one utilizes a mechanical working step which impairs the durability of the inner tube and in addition is tedious, time wasting and costly. In addition to the danger of possible wear of the patch which is unfavorable when the same is of substantial thickness, one must consider at least to the same extent the danger of setting up unfavorable tension conditions which must occur if it is desired to satisfy the apparent contradictory conditions of providing a patch with its central portion as firm and rigid as possible and the marginal zone as elastic as possible.

Accordingly, the present invention has for an object to provide a repair patch which obviates the above disadvantages by providing a patch which solves the problem of complying with the requirements set forth and establishes a favorable compensation of the tension between the middle portion of the patch, the edge of the patch, and the article being repaired in which the repair patch of the invention is as thin as possible and incorporates a finely graduated transition from a rigid central portion having comparatively little elasticity to a quite thin and highly elastic marginal zone.

Specifically this invention has for an object to provide a repair patch which while incorporating a vulcanized main body layer having a tapered upper surface extending from the central portion laterally outward to a tapered rim and a thin flexible unvulcanized attaching layer of substantially greater cross sectional area than that of the body layer, includes a diminishing of the thickness of the body layer in relation to known patches of this type and further adequately compensates for the differences in tension by incorporating a finely graduated increasing of its elasticity from the central portion to the flexible and marginal rim zone.

It is a further specific object to provide a repair patch of the immediately aforedescribed character including an insert of any desired and expedient shape which is vulcanized to the main body and which is of a less elastic rubber than the rubber of the main body.

It is a further specific object to provide a repair patch including a thin flexible adhesive attaching or connecting layer surmounted by a body layer of less dimensions than the connecting layer so as to provide a flexible marginal zone and in which a reinforcing insert of harder and thus less elastic rubber is embodied in the body layer and in which the body layer includes circumferentially spaced appendages or tentacle-like portions extending at least part way into the thin flexible marginal zone.

Further and more specific objects will be apparent from the following description taken in connection with the accompanying drawings, in which:

Figure 1 is a cross section through a repair patch of a known type, representing the state of the art and comprising a main body of vulcanized rubber, and an adhesive or connecting layer of unvulcanized rubber, a protective layer arranged over the connecting layer and a covering layer arranged over the main body, Figure 2 is a cross section through a repair patch constructed in accordance with the invention and which is built up of separate layers, the view illustrating the layers before they are vulcanized together, Figure 3 is a cross sectional view through a repair patch in accordance with one embodiment of the invention, Figures 4 and 5 are cross sectional views illustrating further embodiments of the invention on the scale of Figure 2, Figures 6 and 7 are plan views on a reduced scale illustrating the patch of Figure 3 and a modified form of patch respectively, Figures 8a and 8b are respective fragmentary views in plan of different embodiments of patches which include a main body of special shape, Figure 9 is a plan view of a repair patch in accordance with the invention, including a special shaped patch and a special shaped reinforcing insert, Figure 10 is a fragmentary longitudinal sectional view on an enlarged scale through the patch of Figure 9, and Figures 11 and 12 are respective fragmentary plan views of further embodiments of repair patches constructed in accordance with the invention.

In order to illustrate the state of the art and to emphasize the improvement embodied in the present invention, a repair patch such as is in use at the present time for the repair of vehicle inner tubes, rubber tubes, conveyor belts or the like, is shown in Figure 1. This patch consists of a so-called main body of vulcanized rubber 1 and a thin adhesive attaching or connecting layer 2 which is arranged on the main body and extends substantially beyond the outer periphery of the main body so that a highly elastic or flexible rim 3 is formed. This rim is of substantial importance since a satisfactory adhesion of the patch to the article being repaired is only ensured if the relative parts of the patch are able to participate in the unavoidable and frequently occurring movements of the article, such as squeezing movements. As illustrated, the adhesive or connecting layer of the patch is provided with a protective layer 4, for example, cellophane, cellulose or a similar substance, and the body layer is provided with a cover layer 5 of paper, cellulose or similar substance. Both the protective layer and the covering layer are removable and the latter layer is provided to ensure that the patch can be applied to the article being repaired without creasing. In the other figures, the protective and covering layers are omitted for simplicity in illustration.

To provide for a satisfactory repair with patches, it is of particular importance that the strength and the elasticity of the separate parts, that is the article to be repaired and the patch, be so related to one another that on the one hand the damaged area is tightly sealed in a manner to resist wear and on the other hand, the patch is not deprived of the capability of elastic deformation in the zones thereof which are subject to elongation.

Patches for the repair of inner tubes for motor vehicle or bicycle tires are usually constructed so that the thickness of the patch at its thickest part approximates the thickness of the tube to be repaired. This thickness is illustrated by the distance a, Figure 1. Patches embodying the present invention are illustrated in various forms in Figures 2–12. The patch of Figure 2 consists of a main body which when the patch is of very small dimensions is built up according to the size of separate layers or laminations 6a, 6b. On the under side of layer 6b is arranged an adhesive or attaching or connecting layer 7 which as illustrated at 8 extends substantially beyond the outer periphery of the main body layer. Figure 2 is a sectional view of the patch before the layers are vulcanized together and have merged into one another, while Figure 3 is a sectional view of the patch in its final form.

In accordance with the invention, in building up the main body an insert 9 of vulcanized rubber is embodied with the body layer. As shown in Figure 3, the main body 6 includes an insert 9a of vulcanized rubber of a mixture having greater hardness and smaller elasticity in relation to the rubber of the remainder of the main body. It is possible to obtain this effect, for example, by mixing a relatively high proportion of carbon black or by suitable choice of the accelerator and activating additives in the rubber of the insert.

Due to this graduation of strength and elasticity, there is obtained a highly favorable transition from a rigid middle portion of the main body, which as far as possible is capable of little change in its position, to the outermost edge of the rim of the patch and which edge is as elastic as possible.

As is clear by a comparison of Figures 1 and 3, the invention provides an arrangement in which the thickness of the patch is substantially less than that of known patches. This reduced thickness is indicated by the distance b in Figure 3. The feature of providing a patch of diminished thickness is itself an important advance in comparison with heretofore known patches, since the less a patch projects above the surrounding area of the article to be repaired, the less danger of the patch becoming damaged or detached by mechanical stressing, for example, by rubbing or due to the tension conditions set up by use of the article after it is repaired.

For example, in the repair of inner tubes for motor vehicle tires, it is considered as necessary that the patch have as slight extent upward as possible, since the fact that the patch does not bear entirely smoothly on the interior of the casing establishes the dangerous condition that the upper side of the patch can be detached or rubbed off with the movement of the tube relative to the tire casing. Likewise, for patches which are used to repair conveyor belts, care should be taken that the patch projects above the surface of the belt to the smallest possible extent so that the flow of materials being conveyed is not disturbed and to avoid danger of the patch being damaged by the materials, or by stripper devices associated with the conveyor belt. The diminished thickness is an important improvement of the patch of the present invention.

Figures 3–5 illustrate different modifications of arrangements of the insert relative to the main body. In Figure 3, the insert 9a is vulcanized into the top of the main body layer 6. In Figure 4, the insert 9b is well within the main body and in Figure 5 the insert 9c is vulcanized into the under surface of the main body.

Figure 1:
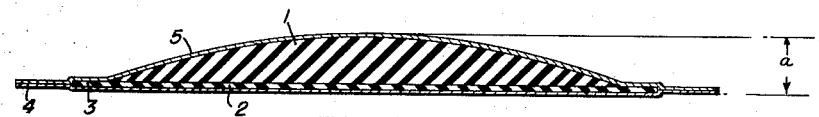
Figure 2:
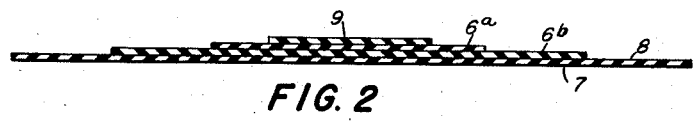
Figure 3:
Figures 3–5 clearly illustrate the fact that the harder and less elastic insert has substantially less thickness than that of the central portion of the main body.
Figure 4:
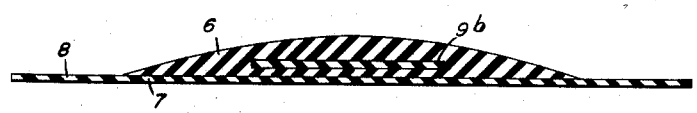
Figure 5:
Figure 6:
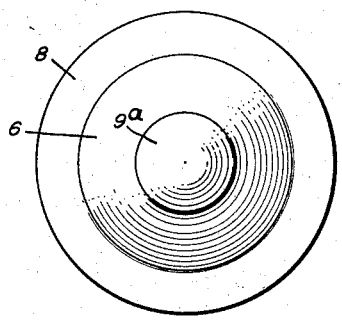
Figure 6 is a plan view of the arrangement of Figure 3 and clearly illustrates the differences in cross sectional areas occupied by the insert, the main body and the thin flexible attaching or connecting layer.
Figure 7:
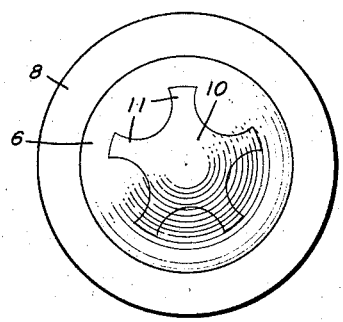
Figure 7 illustrates a modification in which the insert denoted at 10 includes fingers or appendages at 11 extending radially outward of the central portion of the insert and into the main body so as to provide a particular efficacious anchoring of the insert in the main body.
Figure 8A:
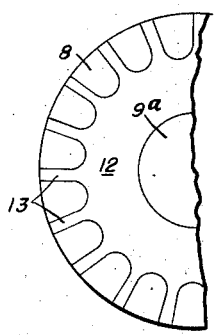
Figure 8B:
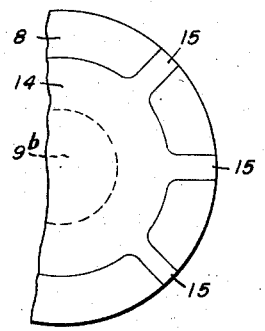
Figure 9:
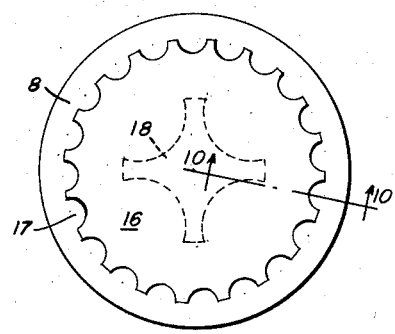
Figure 10:
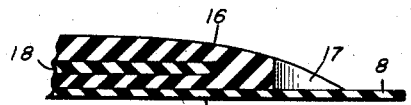
Figure 11:
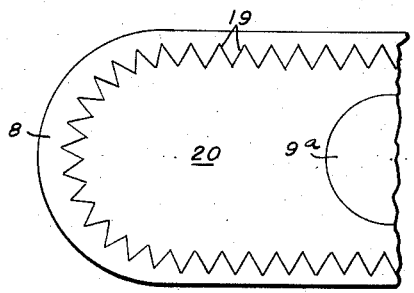

Other embodiments incorporating patches other than the plan shapes of Figure 6 are shown in Figures 8a, 8b, 9 and 10. In these figures, the main body layers 12, 14 or 16 include appendages or projections that extend radially outward toward the perimeter of the flexible marginal zone 8 of the attaching layer. In Figures 8a and 8b, the fingers 13 and 15 respectively extend as far as the outermost edge of the attaching or connecting layer. In Figures 9 and 10, the circumferentially spaced fingers extend only over a portion of the radial extent of the flexible marginal rim zone 8. These individual projections or finger-like portions of the main body layer can have a wide variety of forms, that is, they can be wider or sharper according to the desired use. In Figure 11, the main body layer 20 has a serrated edge or tooth portions at 19. The fine graduation in the transition from the rigid central or middle portion of the patch having comparatively little elasticity to the highly flexible elastic rim is increased in a particular efficacious manner by a constructional form that reduces the danger of a whole or partial detachment if the reinforcing insert 18 as in Figure 9, also has finger-like projections or appendages extending radially from the center thereof in addition to the formation of the projections 17 on the main body layer.

The reinforcing insert 9a of Figure 8a is vulcanized into the top of the body layer. In Figure 8b and in Figures 9 and 10, the reinforcing inserts 9b and 18 respectively are embedded in the median portion of the body layer.

Figure 12:
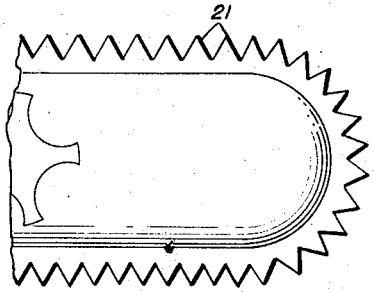

Figure 12 illustrates a further embodiment in which the transition for equalizing the tension between the highly elastic marginal zone and the article being repaired is assured and which includes the provision of a serrated edge 21 on the adhesive or connecting layer. In this embodiment, the reinforcing insert is provided with fingerlike projections. Such serrated feather edge also permits a second patch which may subsequently be required to be closely spaced from a similar first patch and in interengagement therewith. Also such serrated feather edge may overlie parts of a first patch without substantially increasing the thickness thereof, the serrations then affording a more gradual merger of one patch into the other.

The following compositions of the individual layers forming the new repair patch, which, however, are being stated for example only, have proved very successful in actual practice:

a. Main body 6:
   India-rubber, approx_____ 50 parts by wt.
   Regenerated rubber, approx_____ 20 parts by wt.
   Filler, e. g. chalk, approx_____ 30 parts by wt.
   Sulphur for India-rubber_____ 1.5 to 3%.

o-toluylbiguanide or di-o-toluyl-guanadin (Vulkacit 1000) 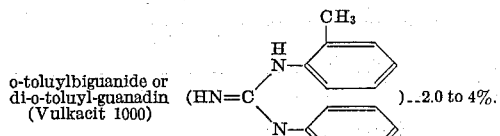 __2.0 to 4%.

2-merkaptobenzothiazol (Merkapto) 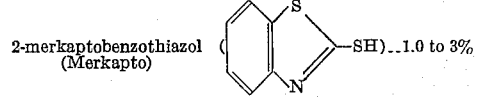 __1.0 to 3% b. Connecting layer 7:
   Sheet rubber_____ 30 to 50 parts by wt.
   Filler, e. g. chalk_____ 70 to 50 parts by wt.
   Sulphur for India-rubber_____ .3 to 2.0%.

c. Reinforcing insert 9:
   Sheet rubber_____ 55 parts by wt. approx.
   Carbon or silica black or equivalents_____ 30 parts by wt. approx.
   Filler, e. g. chalk_____ 15 parts by wt. approx.
   Sulphur and accelerators_____ as in main body 6.

Although the dimensions of the new repair patches may be varied in accordance with the particular object to be repaired and the wear and stresses which they are to resist, patches with the following dimensions and having a composition as stated above have in practical tests proved very successful:

|  | I | II | III | IV | V | VI |
|---|---|---|---|---|---|---|
|  | mm. | mm. | mm. | mm. | mm. | mm. |
| Total patch diameter | 60 | 80 | 100 | 42×80 | 52×110 | 80×158 |
| Main body 6, diameter | 53 | 70 | 90 | 33×70 | 43×102 | 70×148 |
| Reinforcing insert 9, diameter | 18 | 25 | 30 | 20 | 25 | 30 |
| Main body 6, thickness | 1.75 | 2.2 | 2.8 | 2 | 2.4 | 2.7 |
| Connecting layer 7, thickness | .05 | .05 | .05 | .05 | .05 | .05 |
| Reinforcing insert 9, thickness | .6 | .8 | .8 | .8 | .8 | .8 |

It is thus clear that the invention provides a repair patch of reduced vertical dimensions in comparison with known repair patches. It complies with the requirements of tightly and securely sealing the damaged portion, for example, a tear or puncture in an inner tube, and in making the entire patched portion as elastic and flexible as possible, while protruding only very slightly over the adjacent unpatched parts.

The inventive combination in a repair patch of the relative solidity of the portion covering the actual tear or puncture, the high elasticity and flexibility of the thin, feathered edge portion, and the gradual merger of these two portions into each other by the main body portion insofar as the elasticity, flexibility, and thickness is concerned render the patched portion as strong as, or even stronger than, an undamaged, unpatched portion of, for example, an inner tube. Inasmuch as the thickest, central portion protrudes very little above the unpatched surroundings and levels off into such unpatched portion very gradually, the danger of excessive friction between the patch and the tire caused by their relative movement when driving, and the danger that the patch might be torn off, are thus completely avoided.

These advantages are obtained according to the invention by the combination of several layers of rubber of different dimensions and different qualities of elasticity and flexibility, merged together to form a single unit. These advantages may, as described, be further enhanced by providing the main body portion with circumferentially spaced projecting portions extending like fingers into the flexible marginal zone of the attaching layer. Similarly, to merge the relatively solid central portion more gradually with the surrounding body portion, such central portion may be provided with radially extending fingers projecting into the main body portion of the patch.

While I have described my invention with reference to the preferred embodiments thereof, I wish to have it understood that my invention is in no way limited to the details of such embodiments or to the specific examples described, but is capable of numerous modifications within the scope of the appended claims.

What is claimed is:

1. A repair patch for rubber and rubberized articles such as inner tubes for motor vehicles and bicycle tires, rubber shoes, conveyor belts and the like, comprising a body layer of vulcanized rubber, a thin, adhesive, flexible attaching layer secured to the body layer and a reinforcing means embodied with the body layer comprising at least one insert of a rubber that is less elastic and harder than the rubber of the body layer but which is sufficiently extensible to provide the patch with a gradual increase of elasticity from the central portion outwards to the rim, so that the patch has a simultaneous decrease in rigidity in the same direction, said insert having substantially less thickness and cross sectional area than the corresponding dimensions of the body layer and said insert being so centered relative to the body layer as to overlie the damaged area to be repaired when the patch is applied.

2. A repair patch as claimed in claim 1, in which the reinforcing insert is vulcanized into the rubber of the body layer.

3. A repair patch for rubber and rubberized articles comprising a body layer of vulcanized rubber having a tapered rim and a flat bottom, a thin, adhesive, flexible attaching layer secured to the bottom of the body layer, said attaching layer having a substantially greater area than the area of the body layer so that the rim of the body layer is disposed inwardly of the perimeter of the attaching layer a substantial distance to provide a thin, highly flexible marginal zone of attaching layer and to provide for compensation of tension between the central portion of the patch, the perimetrical edge thereof and the article to be repaired, an insert at the central portion of the body layer of substantially less thickness and cross sectional area than the corresponding dimensions of the body layer, said insert comprising a stretchable rubber body of greater hardness and less elasticity than the rubber of the body layer and being vulcanized to the body layer so as to provide a patch having a finely graduated transition from a substantially rigid central portion having comparatively little elasticity to a thin and highly elastic and flexible marginal zone.

4. A repair patch for rubber and rubberized articles as claimed in claim 3, including a removable protective covering layer on the outer surface of the attaching layer and a removable protective cover layer on the outer surface of the body layer and both covering layers having a substantially greater area than the area of the body layers.

5. A repair patch for rubber and rubberized articles as claimed in claim 3, in which the reinforcing insert is of regular shape.

6. A repair patch for rubber and rubberized articles as claimed in claim 3, in which the reinforcing insert includes a central portion and circumferentially spaced appendages extending radially outwards into the body portion.

7. A repair patch for rubber and rubberized articles as claimed in claim 3, wherein the body layer includes radially extending narrow appendages extending at least part way into the flexible marginal zone.

8. A repair patch for rubber and rubberized articles as claimed in claim 7, in which the appendages of the body layer extend to the perimetrical edge of the attaching layer.

9. A repair patch for rubber and rubberized articles as claimed in claim 3, wherein the marginal edge of the attaching layer is irregular.

10. A repair patch for rubber and rubberized articles as claimed in claim 9, wherein the irregular edge of the attaching layer is serrated.

11. A repair patch for rubber and rubberized articles as claimed in claim 3, wherein the insert is vulcanized into the top of the body layer.

12. A repair patch for rubber and rubberized articles as claimed in claim 3, wherein the insert is vulcanized to the bottom of the body layer.

13. A repair patch for rubber and rubberized articles as claimed in claim 3, wherein the insert is vulcanized into the body layer in the median portion thereof.

14. A repair patch for rubber and rubberized articles as claimed in claim 3, wherein the insert and the body layer each include central portions and radially disposed spaced integral projections.

15. A repair patch for rubber and rubberized articles comprising a main body of rubber of medium elasticity, a thin bonding layer of highly elastic unvulcanized rubber secured to the under surface of the main body, and embodied with the main body a rubber insert harder and stiffer than the rubber of the main body and still having the capability of extension, said main body portion including a marginal construction having outwardly directed extensions that are thin in relation to the marginal extent of the patch, so that the central portion including the insert which is relatively solid is gradually merged into the marginal portion of the patch by the extensions, and said thin bonding layer having a perimetrical portion, a substantial part of which is unattached to the main body.

16. A repair patch as claimed in claim 15, in which the insert is vulcanized into the top of the main body, the main body tapering downwardly outwards from its central portion, and said extensions continuing the taper.

17. A repair patch as claimed in claim 15, in which the insert is vulcanized to the main body, the main body tapering downwards from a central portion to the extremity of the extensions.

References Cited in the file of this patent

UNITED STATES PATENTS

| | | |
|---|---|---|
| 2,486,669 | Nassimbene | Nov. 1, 1949 |
| 2,638,955 | Gruber | May 19, 1953 |

FOREIGN PATENTS

| | | |
|---|---|---|
| 284,095 | Great Britain | Jan. 26, 1928 |